United States Patent [19]

Schirmer

[11] Patent Number: 4,937,112
[45] Date of Patent: Jun. 26, 1990

[54] HIGH STRENGTH COEXTRUDED FILM FOR CHUB PACKAGING

[75] Inventor: Henry G. Schirmer, Spartanburg, S.C.

[73] Assignee: W. R. Grace & Co.-Conn., Duncan, S.C.

[21] Appl. No.: 135,169

[22] Filed: Dec. 18, 1987

[51] Int. Cl.$^5$ .................. B65D 81/24; B32B 27/30
[52] U.S. Cl. .................. 428/34.3; 428/36.7; 428/475.8; 428/476.9; 428/516; 428/518; 428/520; 428/349; 264/514; 264/515
[58] Field of Search .................. 428/35, 349, 475.8, 428/476.9, 516, 518, 520, 34.3, 36.7

[56] References Cited

U.S. PATENT DOCUMENTS

| | | | |
|---|---|---|---|
| 3,223,761 | 12/1965 | Raley | 264/514 |
| 4,386,124 | 5/1983 | Akao | 428/35 |
| 4,477,532 | 10/1984 | Schmukler et al. | 428/441 |
| 4,801,486 | 1/1989 | Quacquarella et al. | 428/520 |
| 4,803,122 | 2/1989 | Schirmer | 428/520 |

FOREIGN PATENT DOCUMENTS

0092897A2 11/1983 European Pat. Off. .

OTHER PUBLICATIONS

HS 660 Film.
HS 2000 Film.

Primary Examiner—P. C. Ives
Attorney, Agent, or Firm—John J. Toney; Willian D. Lee, Jr.; Mark B. Quatt

[57] ABSTRACT

A multilayer hot blown film useful in chub packaging comprises a first outer layer of a heat-sealable polymeric material; a first interior layer of a high molecular weight polymeric material; a second interior layer of a polyamide; and a second outer layer of a self-weldable polymeric material.

4 Claims, 1 Drawing Sheet

HIGH STRENGTH COEXTRUDED FILM FOR CHUB PACKAGING

BACKGROUND OF THE INVENTION

This invention relates generally to a coextruded film suitable for packaging, and more particularly to a hot blown film suitable for use in chub packaging and having improved tensile strength and seal strength properties.

Certain foods, and particularly meat products such as ground beef and other comminuted food substances, are commonly packaged in what are called chub packages. These packages are generally produced at central processing plants operated by supermarket chains or meat packing companies. These packages are generally produced using a vertical form fill seal (VFFS) process, in which a tube is formed from a flat sheet of roll stock film. The tube is formed vertically and longitudinally sealed with a vertical sealing bar. The bottom of the tube is then sealed with a clip applied to the bottom of the tube, the meat product such as ground beef is pumped into the open end of the tube, and the top is sealed with a clip to produce the final chub package. In appearance, these chubs resemble semi-rigid tubes with the tubular film forming a skin tight layer around the food product.

Package sizes may range from 1 to 20 pounds, depending on the intended mode of distribution. Pumping equipment typically used to stuff the food product into the tubular film can place great stress on the longitudinal seal of the tube. This longitudinal seal is usually a lap seal.

More recently, crust-frozen items have become more popular, and the hardening of the outer surface of the food product in the tubular casing during the freezing process can produce further stress on the longitudinal seal.

Successful films for use in such applications include the HS660 and HS 2000 films produced commercially by the Cryovac Division of W. R. Grace & Co. The films are composed of lay-flat tubular film. Prior to collapse, the HS660 film includes an inner layer of ethylene vinyl acetate copolymer (EVA) and an outer layer of polyethylene (PE). The two core layers comprise nylon, with an intermediate layer between each nylon layer and respective outer layer and inner layers comprising ionomer resins. In case of HS 2000, an ethylene vinyl alcohol copolymer replaces the nylon layer closest to the inside of the structure.

While such materials have been very useful in producing chub packaging, it is an object of the present invention to further improve the performance of chub packaging materials, especially under conditions wherein improved seal strength and lower transverse elongation are desirable.

SUMMARY OF THE INVENTION

In one aspect of the invention, a multilayer hot blown film useful in chub packaging comprises a first outer layer comprising a heat-sealable polymeric material; a first interior layer comprising a polymeric material of high molecular weight; a second interior layer comprising a polyamide; and a second outer layer comprising a self-weldable polymeric material.

In another aspect of the present invention, a method of making a multilayer thermoplastic film useful in chub packaging comprises producing a first melt stream of a heat-sealable polymeric resin, a second melt stream of a high molecular weight polymeric resin, a third melt stream of a polyamide, and a fourth melt stream of a self-weldable polymeric material; coextruding the melt streams through an annular die to form a tubular film; hot blowing the coextruded tubular film to melt orient the film; cooling the hot blown film; and collapsing the cooled film to form a lay-flat tubular film.

BRIEF DESCRIPTION OF THE DRAWINGS

The invention may be further understood by reference to the attached drawings wherein.

DETAILED DESCRIPTION OF THE PREFERRED EMBODIMENT

Figure 1:
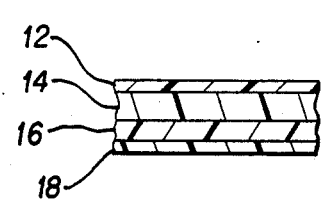
FIG. 1 is a schematic cross-sectional view of one embodiment of the present invention.

Referring to FIG. 1, a hot blown film 10 includes a first outer layer 12 of a heat sealable material, preferably linear low density polyethylene or another olefin homopolymer or copolymer. Additives such as slip agents may be added to the heat sealable material of layer 12 in minor amounts sufficient to provide the machinability or other desired properties depending on the end use of the packaging material, and the particular equipment in which the packaging material of the present invention will be used. Layer 12 is a relatively thin layer of preferably constant gauge throughout the various embodiments, in order to create more uniform sealant properties in the packaging material.

Layer 14 includes a high molecular weight polymeric material, and preferably homopolymers copolymers of ethylene such as low density polyethylene, high density polyethylene, and ethylene vinyl acetate copolymer. The high molecular weight is characterized by a fractional melt index, i.e. a melt index of less than about 1 gram/10 minutes at standard ASTM conditions. By providing a high molecular weight material for the first interior layer 14, improved bubble stability and more orientation of the film is achieved during the blow up process as the film leaves the coextrusion die. This relates to lower elongation properties and flatter rolls with better machinability in the final film. Additives such as pigments which could effect sealability if included in first layer 12 are preferably included in first interior layer 14 without substantially affecting the sealing properties of the film.

Second interior layer 16 is made up of a polyamide which imparts high temperature performance during sealing of the film, and good tensile strength. Various polyamides are suitable for use in second interior layer 16, including but not limited to nylon 6, nylon 66, nylon 12, and blends and copolymers thereof. The particular polyamide and gauge of layer 16 can be selected to optimize the properties imparted to the film by such materials.

Second outer layer 18 comprises a self-weldable material, i.e. a material that will adhere to itself when a double wound, lay-flat film is produced. Many polymeric materials are suitable for use in second outer layer 18 including copolyamides and ethylene vinyl acetate copolymers. Although a self-weldable material is provided in layer 18, it is not necessary to provide a double wound, lay-flat film in order to achieve a useful film in accordance with the present invention. Thus, a single wound film having second outer layer 18 as in effect another surface layer of film 10 may be utilized. This is exemplified and illustrated in FIG. 1.

Figure 2:
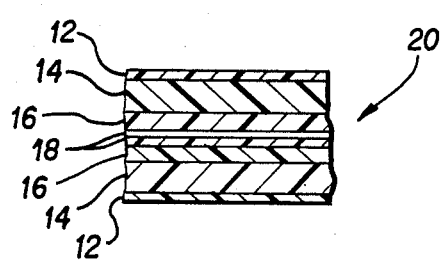
FIG. 2 is a schematic cross-section of a double wound, lay-flat tubular film of FIG. 1.

In FIG. 2, a double wound version of the film of FIG. 1 is shown. In this case, melt streams for each of the resins of layers 12 through 18 are produced and coextruded through an annular die to form a tubular film. The film is hot blown by techniques well known in the art to melt orient the film. Thereafter, the hot blown film is cooled and then collapsed to form a lay-flat tubular film. Thus, the self-welding material of layer 18 will weld to itself at the interior collapsed interface of the film. Of course, as illustrated in FIG. 1, a single wound film can be produced using the tubular coextrusion process, but slitting the tubular film after collapsing the film to form a single wound film as shown in FIG. 1.

Figure 3:
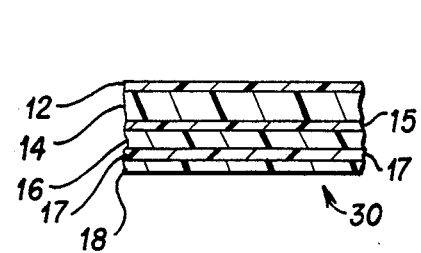
FIG. 3 is a schematic cross-section of the preferred embodiment of the present invention.

It may be desirable, depending on the nature and compatibility of the polymeric materials used for layers 14 and 16, the thickness of layer 12, and the presence or absence of additives to layers 14 and 16, to provide a polymeric adhesive to establish or strengthen the interlaminar bond between layers 14 and 16. This can be accomplished as shown in FIG. 3 by the introduction of an adhesive layer 15 which may comprise a chemically modified polymeric adhesive such as Plexar 3 available from Norchem, or other of the various commercial polymeric adhesives now available. Many of these adhesive are chemically modified polyolefins in which carboxylic acid or carboxylic acid anhydride groups contribute to the bonding quality of the material.

In addition, enhanced oxygen barrier qualities may be provided by the introduction of a layer 17 which may comprise one of the polymers such as ethylene vinyl alcohol copolymer, or vinylidene chloride copolymer (saran) which have particularly low oxygen transmission rates. Intermediate level oxygen barrier materials may also be provided, such as nylon 6 and other of the polyamides. For example, layer 17 may comprise the same polyamide as that of layer 16.

Figure 4:
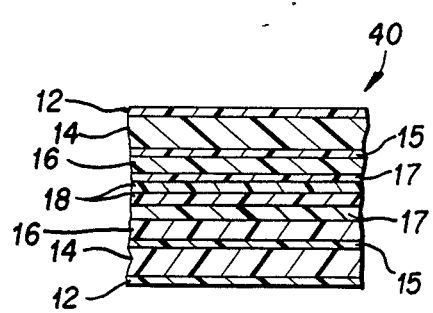
FIG. 4 is a schematic cross-section of the film of FIG. 3 in a double wound, lay-flat tubular arrangement.

FIG. 3 illustrates an especially preferred embodiment of the present invention, in which both adhesive layer 15 and oxygen barrier layer 17 are included in the multilayer structure. A single wound version of this film is illustrated as film 30 in FIG. 3, and a double wound version is illustrated as film 40 of FIG. 4.

The invention may be further understood by reference to the examples of films produced in accordance with the invention.

EXAMPLE 1

About 90% of a linear low density polyethylene (LLDPE) (Dowlex 2035), having a density of about 0.920 grams/cc and a melt index of about 6.25 grams/10 minutes, was blended with about 10% of an antiblocking agent. This agent was a blend of about 90% low density polyethylene (Dow PE 722) having a density of about 0.916 grams/cubic centimeter and a melt index of about 8 grams/ten minutes, and about 10% of a colloidal silica (Syloid 378).

This blend was passed through a first extruder at a temperature of about 425° F.

A high molecular weight ethylene vinyl acetate copolymer (Alathon F-3445) (du Pont) having a vinyl acetate content of about 4% and a fractional melt index, was extruded through a second extruder at extruder temperatures ranging from about 380° F. to 420° F.

A polymeric adhesive (Plexar 3) was extruded through a third extruder at a temperature of about 400° F.

A polyamide, nylon 6 (Capron 8207F) was extruded through a fourth extruder at an extruder temperature of about 500° F.

An ethylene vinyl alcohol copolymer (Soarnol DT) was extruded through a fifth extruder at a temperature of about 450° F.

A copolyamide (Grillon CA-6) was passed through a sixth extruder at a temperature of about 400° F.

The various resin melt streams were coextruded through a 10 inch coextrusion die, and the tubular film was hot blown at a blow-up ratio of 2.86:1, cooled, and collapsed to form a double-wound lay-flat film 45 inches wide welded together at its copolyamide interface.

The deflate rolls for collapsing the film were run at 95 feet/minute, and the cooling ring for cooling the film operated at 50% of maximum capacity. Final film was about 2 mils thick.

EXAMPLE 2

A multilayer hot blown film was produced substantially like that of Example 1, but with a lower blow-up ratio (2.42:1), higher deflate speeds during the collapsing step (115 feet/minute), and cooling ring running at 82% of maximum capacity. Final film width was 38 inches.

EXAMPLE 3

A multilayer film substantially like that of Example 2 was produced, but utilizing ethylene vinyl acetate copolymer (Exxon 32.89), having a vinyl acetate content of about 4.5% by weight and a melt index of 10 grams/10 minutes, in place of the LLDPE. Film width was 38 inches; deflate roll speed 120 feet/minute; and cooling ring operated at 80% of capacity. Blow-up ratio was 2.42:1.

Higher molecular weight materials such as EVA, high density polyethylene, and low density polyethylene improve bubble stability and lead to flatter rolls with better machinability.

The present film is characterized by relatively low transverse elongation, (see Table 1). This property ensures better dimensional stability of the filled tubular film during the filling step of a VFFS process. However, it also puts greater stress on the longitudinal seal of the packaging, since less of the force exerted on the chub package during filling can be accommodated by transverse elongation of the tubular package.

For this reason, improved sealing characteristics are an important attribute of this film. In Table 2, seal data is presented which demonstrates the improved seal strength of films of the present invention.

In Table 1, Examples 1 and 2 correspond to Examples 1 and 2 as described above. Comparative Example 1 refers to the HS660 film, and comparative Example 2 refers to the HS2000 film.

In Table 2, Examples 1, 2, and 3 correspond to the same examples as described above. Comparative Example 2 refers to the HS2000 film.

Seals were applied with a Sentinel Seal, equipped with a ⅛ inch seal bar at 40 psi seal pressure. Seal temperatures of 250° F. and 275° F. were used. Seal strength was determined using a CRE1000 Scott Tester.

The seals were pulled in the conventional manner (designated "peel strength" in Table 2) and also sheared.

As Table 2 indicates, peel and shear strength at both 250° F. and 275° F. were improved, in some cases greatly improved, for the three examples of the present invention in comparison with comparative Example 2, with the exception of comparable performance for the peel strength at 250° F. for Example 2, and a weaker peel strength at the lower temperature for Example 1.

TABLE 1

| | Elongation[1] (%) at 73° F. at Break | | | |
|---|---|---|---|---|
| | Example 1 | Example 2 | Comparative Example 1 | Comparative Example 2 |
| Longitudinal | 392.4 | 448.2 | 521.6 | 337.8 |
| | (2.22) | (2.07) | (2.08) | (2.18) |
| Transverse | 501.8 | 484.4 | 624.5 | 592.0 |
| | (2.28) | (2.06) | (2.03) | (2.10) |

[1] ASTM D882-81 20 inches/minute draw rate; 2 inches initial length. All values are averages obtained from four (4) replicate measurements. Film gauges are indicated in parenthesis.

TABLE 2

| SEAL STRENGTH DATA | | | | |
|---|---|---|---|---|
| | Example 1 | Example 2 | Example 3 | Comparative Example 2 |
| Peel Strength (at 250° F.) | 0.38 ±0.43 | 1.19 ±2.00 | 4.76 ±0.55 | 1.22 ±0.16 |
| Peel Strength (at 275° F.) | 7.56 ±0.41 | 7.08 ±0.88 | 5.54 ±0.48 | 1.26 ±0.26 |
| Shear Strength (at 250° F.) | 7.37 ±0.51 | 8.52 ±0.57 | 8.28 ±0.20 | 6.37 ±0.21 |
| Shear Strength (at 275° F.) | 8.3 ±0.20 | 8.2 ±0.30 | 6.66 ±0.23 | 6.71 ±0.39 |

What is claimed is:

1. A multilayer hot blown film useful in chub packaging comprising:
   (a) a first outer layer comprising a heat sealable material selected from the group consisting of linear low density polyethylene, very low density polyethylene, and blends thereof;
   (b) a first interior layer adjacent the first outer layer comprising a polymeric material of high molecular weight and fractional melt index selected from the group consisting of high density polyethylene, low density polyethylene and ethylene vinyl acetate copolymer;
   (c) a second interior layer comprising a polyamide;
   (d) a second outer layer comprising a self-weldable polymeric material selected from the group consisting of copolyamide and ethylene vinyl acetate copolymer;
   (e) an adhesive layer disposed between the first and second interior layers and comprising a chemically modified ethylene unsaturated ester copolymer; and
   (f) an oxygen barrier layer disposed between the second interior layer and the second outer layer and comprising a material selected from the group consisting of ethylene vinyl alcohol copolymer, vinylidene chloride copolymer and polyamide.

2. A multilayer hot blown film according to claim 1 wherein the polyamide of the second interior layer is selected from nylon 6, nylon 66, nylon 12, and blends and copolymers thereof.

3. A multilayer hot blown film according to claim 1 wherein the film is a lay-flat tubular film having its self-weldable layers laminated together.

4. A multilayer hot blown film according to claim 3 wherein the film has improved heat seals.

* * * * *